(12) United States Patent
Kim (10) Patent No.: US 10,088,041 B2
(45) Date of Patent: Oct. 2, 2018

(54) APPARATUS FOR CONTROLLING SHIFT OF MANUAL TRANSMISSION

(71) Applicant: KYUNG CHANG INDUSTRIAL CO., Ltd., Daegu (KR)

(72) Inventor: Dong Won Kim, Daegu (KR)

(73) Assignee: KYUNG CHANG INDUSTRIAL CO., LTD., Daegu (KR)

( * ) Notice: Subject to any disclaimer, the term of this patent is extended or adjusted under 35 U.S.C. 154(b) by 78 days.

(21) Appl. No.: 15/287,277

(22) Filed: Oct. 6, 2016

(65) Prior Publication Data

US 2017/0102069 A1 Apr. 13, 2017

(30) Foreign Application Priority Data

Oct. 12, 2015 (KR) .......................... 10-2015-0142045

(51) Int. Cl.
| | |
|---|---|
| B60K 20/00 | (2006.01) |
| F16H 61/22 | (2006.01) |
| F16H 59/02 | (2006.01) |
| F16H 59/10 | (2006.01) |
| F16H 59/44 | (2006.01) |

(52) U.S. Cl.
CPC ......... *F16H 61/22* (2013.01); *F16H 59/0217* (2013.01); *F16H 59/0278* (2013.01); *F16H 59/105* (2013.01); *F16H 59/44* (2013.01); *F16H 2059/0282* (2013.01); *F16H 2061/223* (2013.01)

(58) Field of Classification Search
CPC .. F16H 61/22; F16H 59/0217; F16H 59/0278; F16H 59/105; F16H 59/44; F16H 2059/0282; F16H 2061/223
See application file for complete search history.

(56) References Cited

U.S. PATENT DOCUMENTS

| | | | | |
|---|---|---|---|---|
| 5,938,562 A | * | 8/1999 | Withey | ................... F16H 59/10 192/220.3 |
| 5,944,632 A | * | 8/1999 | Hara | ..................... B60W 10/08 477/156 |
| 6,209,408 B1 | * | 4/2001 | DeJonge | ............... F16H 59/044 74/335 |
| 6,325,196 B1 | * | 12/2001 | Beattie | ................ F16H 59/0204 192/220.4 |

(Continued)

FOREIGN PATENT DOCUMENTS

| | | |
|---|---|---|
| CN | 103133684 A | 6/2013 |
| CN | 103161949 A | 6/2013 |

(Continued)

OTHER PUBLICATIONS

Notification of Reason for Refusal for Korean Patent Application No. KR 10-2015-0142045, dated Oct. 26, 2016, 9 Pages.

(Continued)

*Primary Examiner* — Zakaria Elahmadi
(74) *Attorney, Agent, or Firm* — Fenwick & West LLP (57) ABSTRACT

A shift control apparatus of a manual transmission, which is capable of limiting shifting to a low gear at a high speed may be provided. The shift control apparatus of a manual transmission includes: a shift lever 100 including a rod; a shift lock limiting the movement of the rod; and a controller which compares a speed of a vehicle with a predetermined critical speed of a predetermined gear and controls the shift lock. When the speed of the vehicle is greater than the critical speed, the controller prevents down shifting into a predetermined gear.

9 Claims, 11 Drawing Sheets

(56) References Cited

U.S. PATENT DOCUMENTS

| | | | |
|---|---|---|---|
| 9,476,500 B2* | 10/2016 | Skogward | F16H 59/04 |
| 2006/0016287 A1* | 1/2006 | Grossman | F16H 59/0204 |
| | | | 74/473.21 |
| 2011/0036193 A1* | 2/2011 | Ueta | F16H 59/0204 |
| | | | 74/473.21 |
| 2011/0132122 A1 | 6/2011 | Park et al. | |
| 2013/0125692 A1* | 5/2013 | Sasaki | F16H 59/02 |
| | | | 74/473.36 |
| 2014/0000403 A1* | 1/2014 | Kim | F16H 61/22 |
| | | | 74/473.21 |
| 2014/0033849 A1* | 2/2014 | Yamamoto | F16H 59/0217 |
| | | | 74/473.12 |
| 2014/0069221 A1* | 3/2014 | Ishida | F16H 63/34 |
| | | | 74/473.22 |
| 2015/0362067 A1* | 12/2015 | Mitteer | F16H 61/22 |
| | | | 74/490.07 |
| 2016/0025214 A1* | 1/2016 | Yoshida | F16H 63/48 |
| | | | 701/45 |
| 2016/0123460 A1* | 5/2016 | Tsukazaki | F16H 59/105 |
| | | | 74/473.23 |
| 2016/0178050 A1* | 6/2016 | Park | F16H 59/0204 |
| | | | 74/473.18 |
| 2016/0245395 A1* | 8/2016 | Hong | F16H 59/044 |
| 2016/0273461 A1* | 9/2016 | Cousins | F02D 29/02 |
| 2017/0009876 A1* | 1/2017 | Uenomachi | F16H 59/0204 |
| 2017/0108116 A1* | 4/2017 | Kim | F16H 59/0217 |

FOREIGN PATENT DOCUMENTS

| | | |
|---|---|---|
| CN | 103527775 A | 1/2014 |
| JP | H 03-255263 A | 11/1991 |
| KR | 10-2013-0055974 A | 9/1998 |

OTHER PUBLICATIONS

Office Action for Chinese Patent Application No. CN 201610890361.7, dated Jan. 26, 2018, 13 Pages.

* cited by examiner

APPARATUS FOR CONTROLLING SHIFT OF MANUAL TRANSMISSION

CROSS-REFERENCE TO RELATED APPLICATIONS

This application claims the benefit of the Korean Patent Application No. 10-2015-0142045 filed on Oct. 12, 2015, which is hereby incorporated by reference as if fully set forth herein.

BACKGROUND

Field

The present disclosure relates to a shift control apparatus of a manual transmission, and more particularly to a shift control apparatus of a manual transmission, which is capable of limiting shifting to a low gear at a high speed.

Description of the Related Art

A transmission is installed between a clutch and a propeller shaft and transfers power of an engine to a drive wheel by increasing or decreasing a rotational force of the engine in accordance with a driving state of a vehicle.

The engine of the vehicle has a constant rotation direction. Torque generated in the engine is almost constant within a practical rotation speed range, whereas a driving condition of the vehicle varies widely, for example, a start from a stop state, a high speed driving from a low speed driving condition, particularly, a reverse driving condition, etc. Therefore, the transmission is used to allow the engine to sufficiently show its performance in response with each of the driving conditions.

The transmission has various types including a manual transmission, an automatic transmission, a semi-automatic transmission, a continuously variable transmission, etc.

By the operation of a driver, the manual transmission among the above-described various transmissions changes a shift ratio, reverses a rotation direction, and creates a state where no power is transferred. The manual transmission consumes less fuel and has less power loss compared with the automatic transmission.

The driver shifts a gear himself/herself. Hence, the driver may shift to a low gear, for example, the first gear or the second gear intentionally or by mistake even though the vehicle is driven at a high speed. In this case, an overload is added to the manual transmission, and thus, the manual transmission may be damaged.

SUMMARY

One embodiment is a shift control apparatus of a manual transmission. The shift control apparatus includes: a shift lever including a rod; a shift lock limiting the movement of the rod; and a controller which compares a speed of a vehicle with a predetermined critical speed of a predetermined gear and controls the shift lock. The shift lock includes: driving parts and including moving magnets and which linearly reciprocate in a left select direction of the rod and in a right select direction of the rod; and shift lock levers and including fixed magnets. When the speed of the vehicle is greater than the critical speed, the controller moves the moving magnets and in the left select direction. The fixed magnet moves in the left select direction by a repulsive force between the moving magnet and the fixed magnet. The shift lock levers are located on a shift path of the predetermined gear. The movement of the rod is limited in a shift direction of the predetermined gear.

The shift lock levers and may include one ends and the other ends on which the fixed magnet is disposed, and rotational axes may be disposed between the one end and the other end. The other end may rotate at a predetermined angle with respect to the rotational axis in association with the movement of the fixed magnet. The one end may rotate at the predetermined angle with respect to the rotational axis in accordance with the rotation of the other end and may be located on the shift path of the predetermined gear.

Return-springs may be disposed on the rotational axes. When the speed of the vehicle is less than the critical speed, the controller may move the moving magnets in the right select direction, the end rotates reversely at the predetermined angle with respect to the rotational axis by an elastic force of the return-springs, so that the end may not be located on the shift path of the predetermined gear.

The driving parts may further include bodies having a permanent magnet disposed therein, and lock rods having a magnet disposed therein. The controller controls a direction of a current applied to the body, and thus, the polarity of a magnetic field within the body is changed, so that the lock rod may linearly reciprocate.

Another embodiment is a shift control apparatus of a manual transmission. The shift control apparatus includes: a shift lever including a rod; a shift lock limiting the movement of the rod; and a controller which compares a speed of a vehicle with a critical speed of a predetermined gear and controls the shift lock. The shift lock further includes shift lock levers including the other ends, and a sensor sensing positions of the other ends. The sensor transmits information on the sensed positions of the other ends to the controller. The controller determines whether the shift lock is in an open-state or in a locked-state on the basis of the received information on the positions of the other ends. When the shift lock is in an open-state and the speed of the vehicle is greater than the critical speed, the controller controls the shift lock to be located on a shift path of the predetermined gear, thereby limiting the movement of the rod 110 in a shift direction of the predetermined gear.

Metal parts may be disposed on the other side of the other ends. The sensor may include hall ICs detecting a distance between the sensor and metal parts.

The shift lever may further include a stopper disposed on the rod. The stopper may be disposed to lean in a left select direction of the rod.

The rod may further include a stopper. The stopper may have a shape protruding in a left select direction of the rod.

The shift control apparatus of a manual transmission may further include an electronic control unit (ECU) which measures the speed of the vehicle. The controller may receive the speed of the vehicle from the ECU.

The shift lock may include a first shift lock and a second shift lock which are operated independently of each other. The predetermined gear may include a first gear and a second gear. The critical speed may include a first critical speed of the first gear and a second critical speed of the second gear. The second critical speed may be greater than the first critical speed. When the speed of the vehicle is less than the second critical speed and greater than the first critical speed, the controller may control the first shift lock to be located on a shift path of the first gear and may control the second shift lock not to be located on a shift path of the second gear.

DETAILED DESCRIPTION

An embodiment of the present disclosure will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

Embodiment

Figure 1:
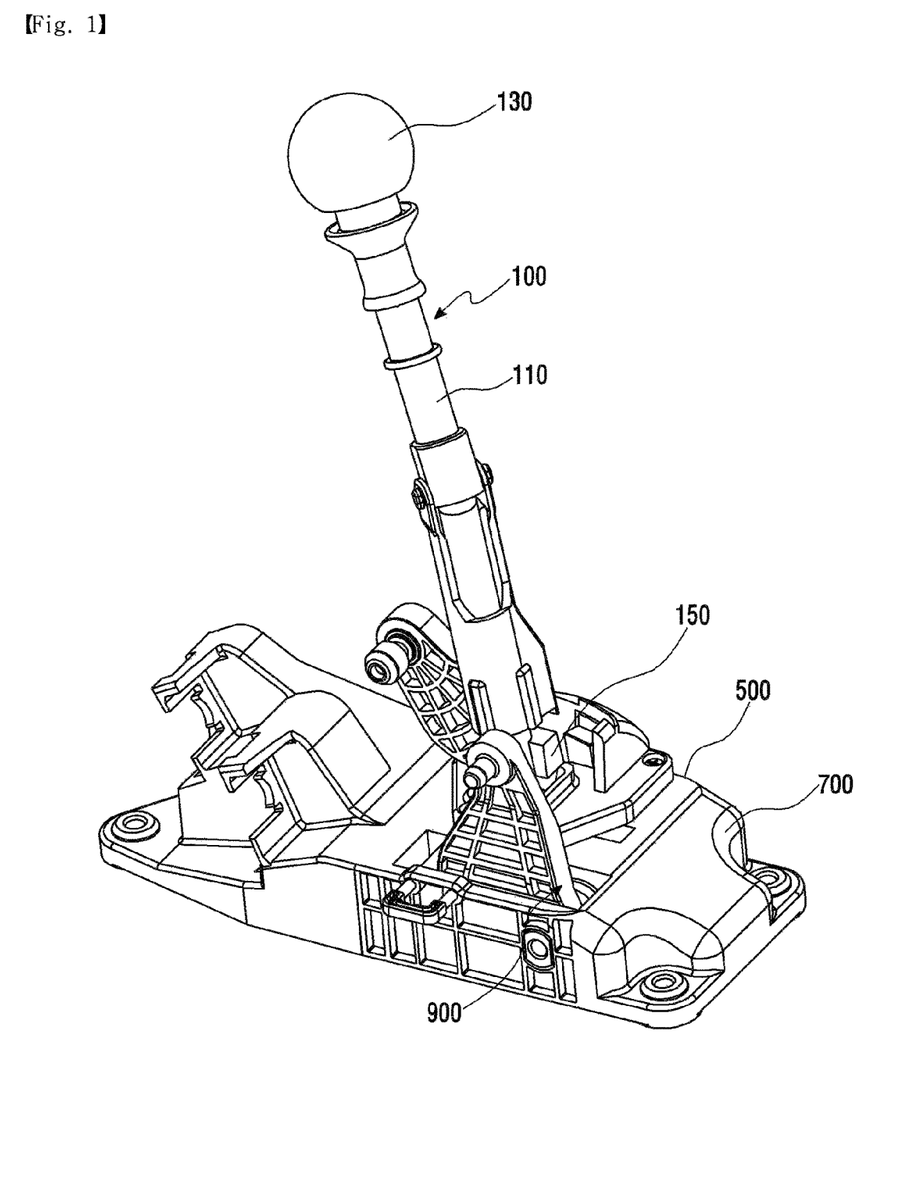
FIG. 1 is a perspective view of a shift control apparatus of a manual transmission according to an embodiment of the present disclosure.
Figure 2:
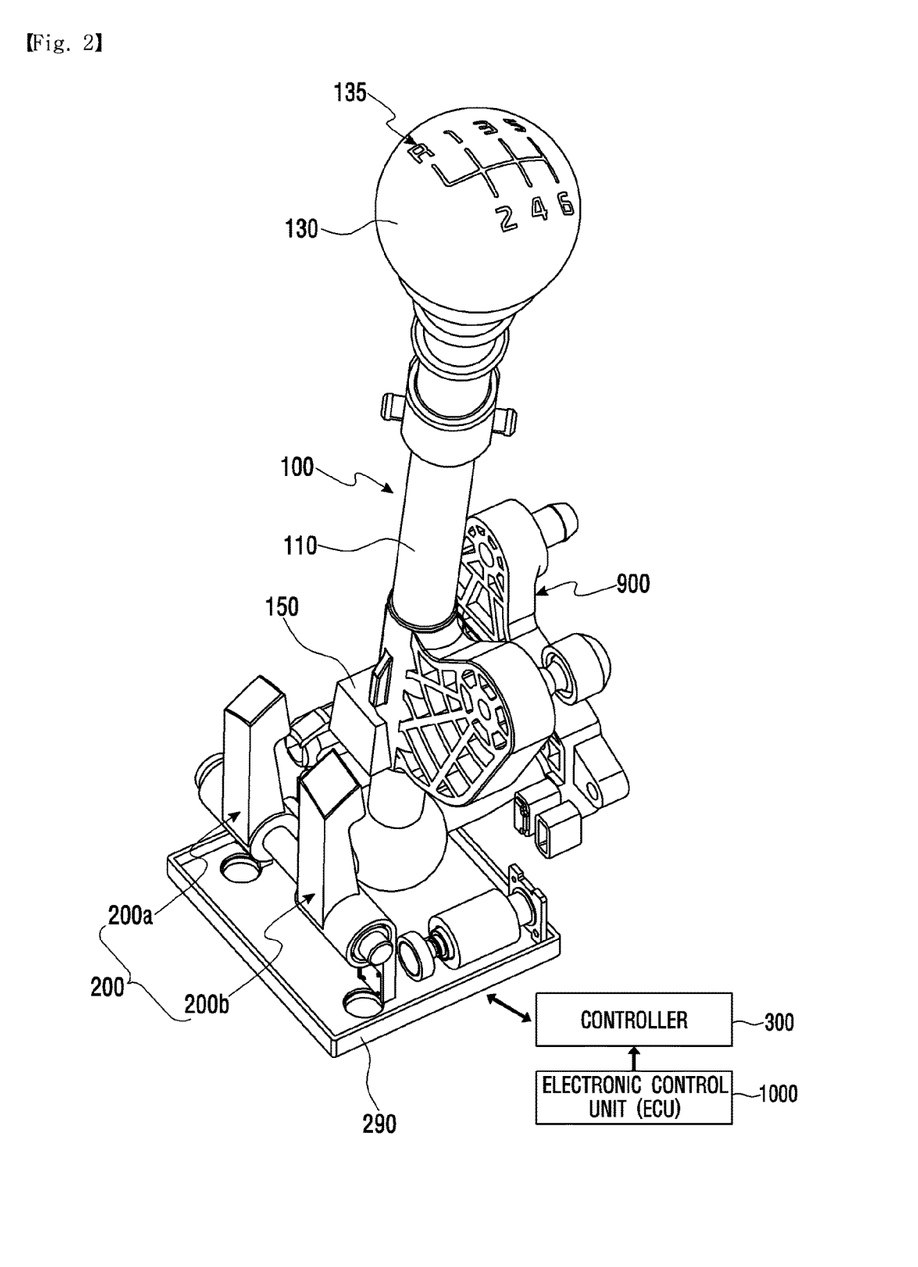
FIG. 2 is a perspective view showing the shift control apparatus of the manual transmission shown in FIG. 1, of which some parts have been removed according to an embodiment of the present disclosure.
Figure 3:
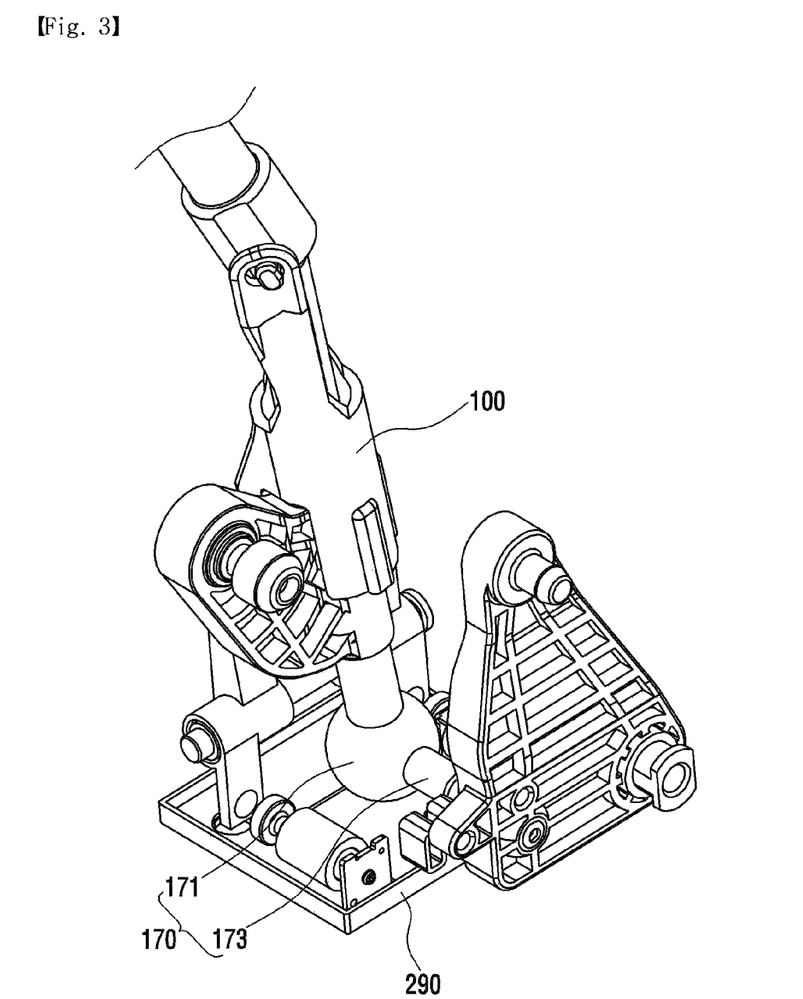
FIG. 3 is a perspective view of the shift control apparatus of the manual transmission shown in FIG. 2, as viewed in another direction according to an embodiment of the present disclosure.

FIG. 1 is a perspective view of a shift control apparatus of a manual transmission according to an embodiment of the present disclosure. FIG. 2 is a perspective view showing the shift control apparatus of the manual transmission shown in FIG. 1, of which some parts have been removed according to an embodiment of the present disclosure. FIG. 3 is a perspective view of the shift control apparatus of the manual transmission shown in FIG. 2, as viewed in another direction according to an embodiment of the present disclosure.

Prior to the description of the shift control apparatus of the manual transmission according to the embodiment of the present disclosure with reference to FIGS. 1 to 3, terms required to describe the shift control apparatus of the manual transmission according to the embodiment of the present disclosure will be defined.

In the present specification, a "predetermined gear" means any one of the first to n-th gears of the manual transmission (here, n is a natural number greater than 1). Here, n may be determined according to the type of the manual transmission.

The shift control apparatus of the manual transmission according to the embodiment of the present disclosure may include first to sixth forward gears and one reverse gear (R). The predetermined gear will be described in more detail with reference to FIG. 4.

Figure 4:
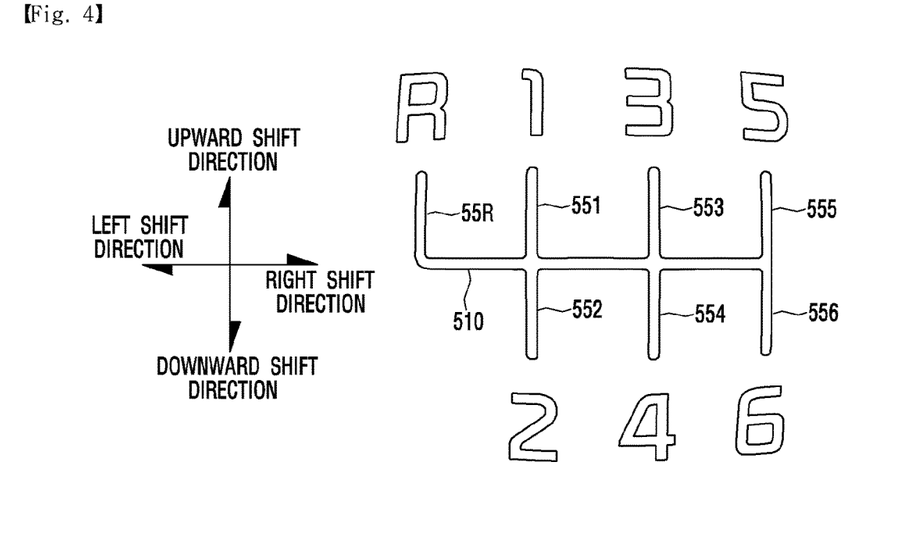
FIG. 4 is an enlarged view of a shift pattern shown in FIG. 2 according to an embodiment of the present disclosure.

FIG. 4 is an enlarged view of a shift pattern 135 shown in FIG. 2 according to an embodiment of the present disclosure.

The shift pattern 135 shown in FIG. 4 may be engraved or embossed in a knob 130 of a shift lever 100 shown in FIG. 2. A rod 110 shown in FIG. 2 is moved along the shift pattern by a driver.

The shift pattern may include one select pattern 510 and a plurality of shift patterns 551, 552, 553, 554, 555, 556, and 55R.

The reverse gear (R), the first gear, the third gear, and the fifth gear are disposed above the select pattern 510. The second gear, the fourth gear, and the sixth gear are disposed below the select pattern 510. The first, third, and fifth gears are disposed symmetrically with the second, fourth, and sixth gears, respectively with respect to the select pattern 510. A neutral gear position may be disposed on the select pattern 510 between the third gear and the fourth gear.

In order to shift the rod 110 located at the neutral gear position to the first gear, the rod 110 is moved along the select pattern 510 in a left select direction, and then should be moved along the shift pattern 551 corresponding to the first gear in an upward shift direction.

In order to shift to a low speed gear (the first gear or the second gear) while a vehicle is driven at a high speed, for example, the rod 110 is located at a high speed position (any one of the fourth to sixth gears), it is required that the rod 110 should be moved to the neutral gear position and moved along the select pattern 510 in the left select direction, and then should be moved along the shift pattern 551 and 552 in the upward shift direction or in a downward shift direction respectively.

As such, the rod 110 should be moved along a "predetermined path" so as to shift to a predetermined gear. The "predetermined path" includes at least one "select path" and at least one "shift path". In the present specification, the "select path" means a trace of the rod 110 moving along the select pattern 510, and the "shift path" means a trace of the rod 110 moving along any one of the plurality of shift patterns 551, 552, 553, 554, 555, 556, and 55R.

Meanwhile, in the present specification, a "critical speed" means a speed corresponding to each of the "predetermined gears". The critical speed may be variously set by automobile manufacturers or designers. For example, the critical speed of the first gear may be set to 15 km/h, and the critical speed of the second gear may be set to 30 km/h.

Referring back to FIGS. 1 to 3, the shift control apparatus of the manual transmission according to the embodiment of the present disclosure includes the shift lever 100 including the rod 110, a shift lock 200 limiting the movement of the rod 110, and a controller 300 controlling the shift lock 200. Here, the controller 300 compares the speed of the vehicle with a critical speed of the predetermined gear. As a result of the comparison, if the speed of the vehicle is greater than the critical speed, the controller 300 controls the shift lock 200 to be located on the shift path of the predetermined gear, thereby limiting the movement of the rod 110 in the shift direction of the predetermined gear.

According to the shift control apparatus of the manual transmission according to the embodiment of the present disclosure, when the speed of the vehicle is greater than the critical speed of the predetermined gear at a point of time of the down-shift, it is possible to prevent the down-shift and to reduce the overload of the manual transmission.

The structure of the shift control apparatus of the manual transmission according to the embodiment of the present disclosure will be described in detail with reference to FIGS. 1 to 3.

The shift control apparatus of the manual transmission according to the embodiment of the present disclosure may further include a cover 500, a bracket 700, a select lever 900, and an electronic control unit (ECU) 1000 as well as the shift lever 100, the shift lock 200, and the controller 300. The respective components will be described in detail below.

The shift lever 100 may include the rod 110, the knob 130, a stopper 150, and an insert outer 170.

The rod 110 is used to shift the gear. The rod 110 can be moved along the shift pattern shown in FIG. 4 by the driver.

The knob 130 is provided on the top of the rod 110. The shift pattern 135 shown in FIG. 4 may be formed in the knob 130.

The stopper 150 is mounted on the rod 110. The stopper 150 may be mounted between the top and bottom of the rod 110. The stopper 150 may be mounted between the knob 130 and the insert outer 170. The stopper 150 may be mounted to lean in a particular direction on the edge or circumference of the rod 110. Here, the particular direction corresponds to the select direction shown in FIG. 4, and in more detail, may be the left select direction, i.e., the select directions of the first gear and second gear.

When the stopper 150 is caught by the contact with the shift lock 200, the movement of the rod 110 in the shift direction of the predetermined gear is limited.

Here, the stopper 150 is not necessary. That is, as long as a portion of the rod 110 can function as the stopper 150, the stopper 150 may not be required. In this case, the rod 110 is caught by the shift lock 200, and thus, the movement of the rod 110 in the shift direction of the predetermined gear may be limited. Specifically, the stopper 150 may be a portion of the rod 110 without being mounted on the rod 110. Specifically, this will be described with reference to FIG. 5.

Figure 5:
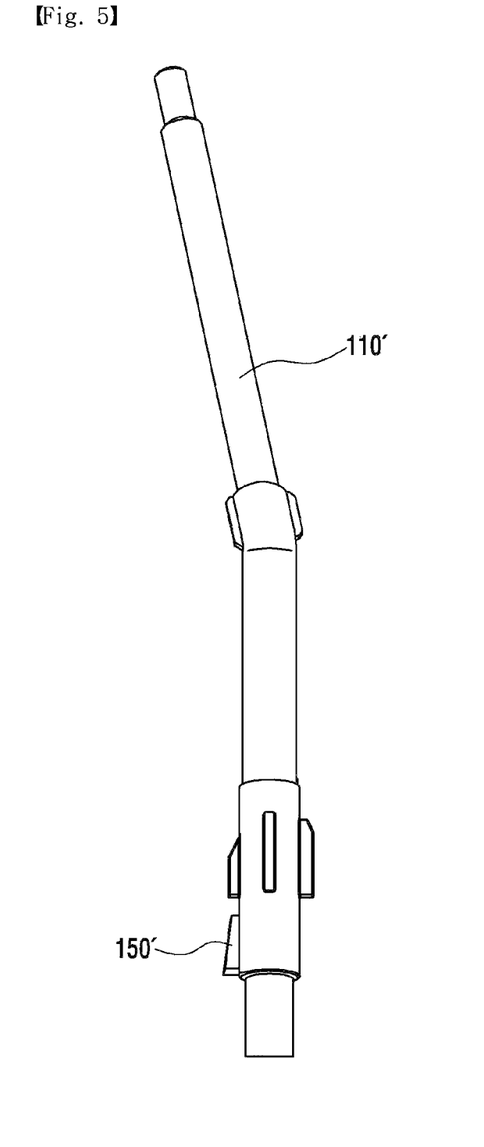
FIG. 5 is a side view showing a modified example of a rod shown in FIG. 2 according to an embodiment of the present disclosure.

FIG. 5 is a side view showing a modified example of the rod 110 shown in FIG. 2.

Referring to FIG. 5, a rod 110' may include a stopper 150'. The stopper 150' may have a shape protruding from a portion of the rod 110' in the left select direction shown in FIG. 4. Since the rod 110' includes the stopper 150', the stopper 150' does not necessarily need to be formed as a separate member like the stopper 150 shown in FIGS. 2 to 3. Therefore, the shift control apparatus of the manual transmission according to the embodiment of the present disclosure has a simpler internal structure and a reduced manufacturing cost.

Referring back to FIGS. 1 to 3, the insert outer 170 is mounted below the rod 110. The insert outer 170 includes a first portion 171 and a second portion 173. The first portion 171 has a spherical shape which can rotate by the operation of the rod 110. The second portion 173 is formed extending from the first portion 171 toward the select lever 900. The second portion 173 is coupled to the select lever 900.

The shift lock 200 may limit or block of the movement of the rod 110 in the shift direction of the predetermined gear by the control of the controller 300.

The shift lock 200 may be disposed adjacent to the shift lever 100. Specifically, the shift lock 200 may be disposed below the shift lever 100. As such, since the shift lock 200 is disposed adjacent to the shift lever 100, spatial degrees of freedom are improved.

One shift lock 200 or a plurality of shift locks 200 may be provided. When the plurality of shift locks 200 are provided, the shift lock 200 may include a first shift lock 200a and a second shift lock 200b. The structure of the shift lock 200 will be described in detail with reference to FIGS. 6 to 8.

Figure 6:
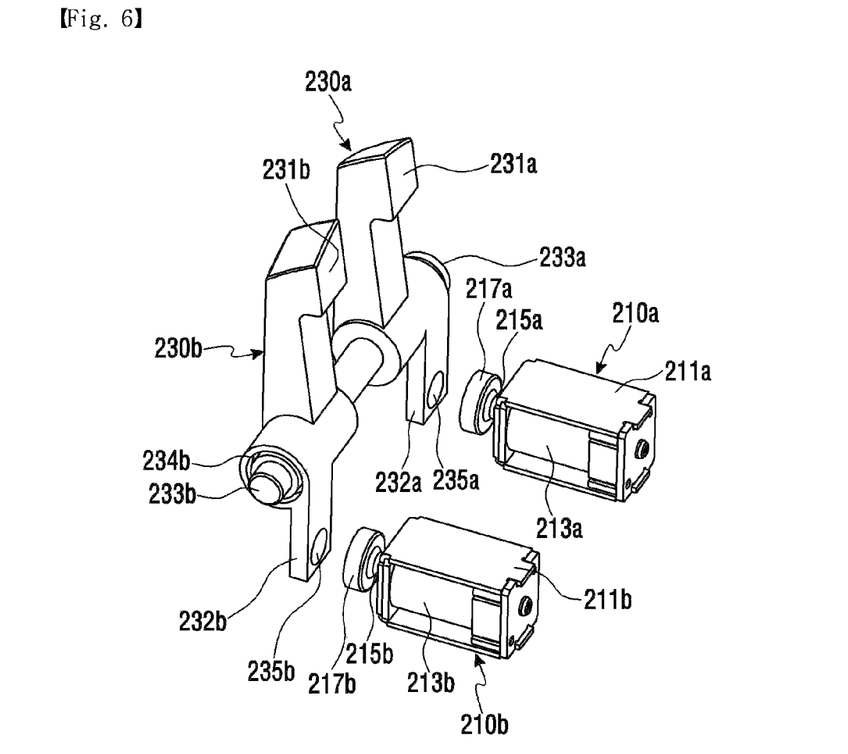
FIGS. 6 to 8 are perspective views of a shift lock shown in FIG. 2 according to an embodiment of the present disclosure.
Figure 7:
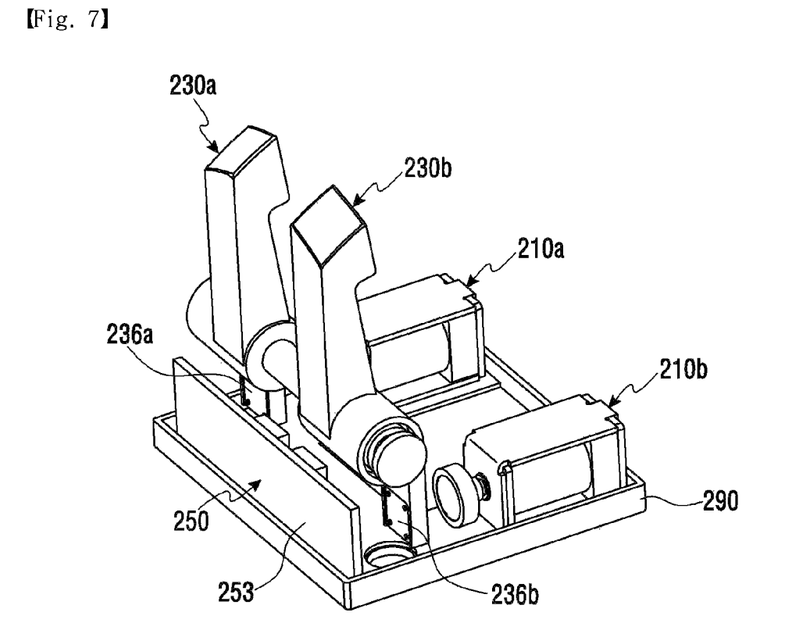
Figure 8:
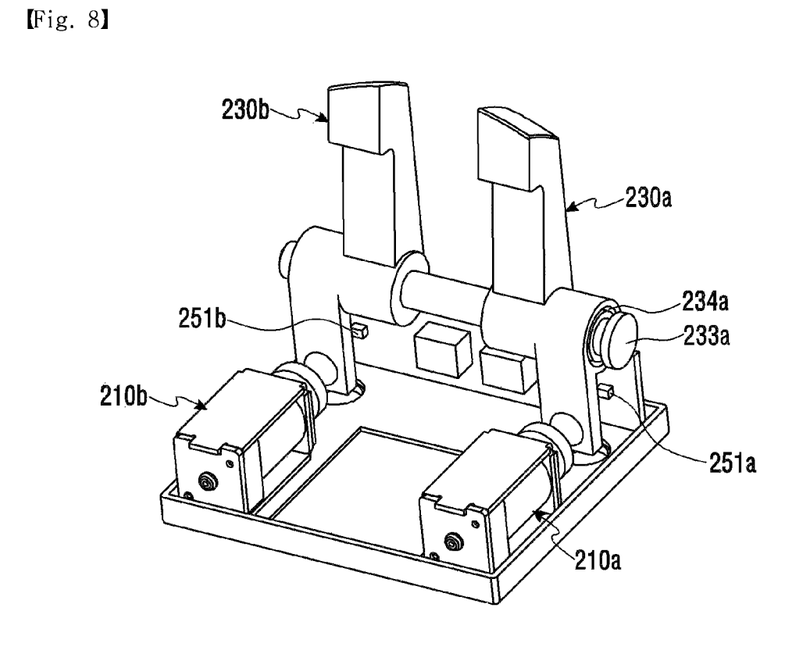

FIGS. 6 to 8 are perspective views of the shift lock 200 shown in FIG. 2 according to one embodiment of the present disclosure.

While the two first and second shift locks 200a and 200b of the shift lock 200 are shown together in FIGS. 6 and 8, one shift lock 200 may be provided.

The first and second shift locks 200a and 200b have the same structure.

Referring to FIGS. 6 to 8, the first and second shift locks 200a and 200b may include driving parts 210a and 210b and shift lock levers 230a and 230b, respectively.

The driving parts 210a and 210b may include solenoids 211a and 211b and moving magnets 217a and 217b.

The solenoids 211a and 211b may include bodies 213a and 213b, and lock rods 215a and 215b.

The lock rods 215a and 215b are respectively mounted on the bodies 213a and 213b. Specifically, the lock rods 215a and 215b may be mounted on the central axes of the cylindrical bodies 213a and 213b.

A magnet (not shown) may be disposed within the lock rods 215a and 215b, and a permanent magnet (not shown) may be disposed within the bodies 213a and 213b.

The lock rods 215a and 215b may linearly reciprocate by the controller 300. The linear reciprocation of the lock rods 215a and 215b can be made by an attractive force and a repulsive force between the magnets mounted within the lock rods 215a and 215b and the permanent magnets mounted within the bodies 213a and 213b. The controller 300 senses information on the speed (high speed) of the vehicle and controls the direction of a current applied to the bodies 213a and 213b. Thus, the polarity of a magnetic field within the bodies 213a and 213b is changed, so that the lock rods 215a and 215b can linearly reciprocate.

The moving magnets 217a and 217b may be disposed on ends of the lock rods 215a and 215b. Here, the moving magnets 217a and 217b may linearly reciprocate with interworking with the lock rods 215a and 215b.

The shift lock levers 230a and 230b include first ends 231a and 231b and the other ends 232a and 232b. The shift lock levers 230a and 230b block the movement of the rod 110. The other ends 232a and 232b are separated by a predetermined gap from the moving magnets 217a and 217b. Rotational axes 233a and 233b are disposed between the first ends 231a and 231b and the other ends 232a and 232b. Return-springs 234a and 234b are disposed on the rotational axes 233a and 233b. Also, fixed magnets 235a and 235b are disposed on one side of the other ends 232a and 232b, i.e., a side facing the moving magnets 217a and 217b. In other words, a predetermined gap between the other end 232a and 232b and the moving magnet 217a and 217b is maintained by a repulsive force between the moving magnets 217a and 217b and the fixed magnets 235a and 235b disposed on one side of the other end 232a and 232b.

The shift lock levers 230a and 230b may perform reciprocating rotation in response to the linear reciprocation of the moving magnets 217a and 217b.

Specifically, a repulsive force acts between the moving magnets 217a and 217b of the driving parts 210a and 210b and the fixed magnets 235a and 235b of the shift lock levers 230a and 230b. In this state, when the lock rods 215a and 215b are moved in the left select direction by the controller 300 and the moving magnets 217a and 217b are moved in the left select direction in response to the lock rods 215a and 215b, the fixed magnets 235a and 235b are moved while maintaining the gap between the moving magnet 217a and 217*b* and the fixed magnet 235*a* and 235*b* due to the repulsive force between the moving magnets 217*a* and 217*b* and the fixed magnets 235*a* and 235*b*. Accordingly, due to the movement of the fixed magnets 235*a* and 235*b*, the other ends 232*a* and 232*b* of the shift lock levers 230*a* and 230*b* perform a rotary motion at a predetermined angle, and the one ends 231*a* and 231*b* of the shift lock levers 230*a* and 230*b* perform the same rotary motion as that of the other ends 232*a* and 232*b* with respect to the rotational axes 233*a* and 233*b*. Here, in order for the moving magnets 217*a* and 217*b* and the fixed magnets 235*a* and 235*b* to have the repulsive force, polarities of facing surfaces of the moving magnet 217*a* and 217*b* and the fixed magnet 235*a* and 235*b* are the same as each other.

Figure 9:
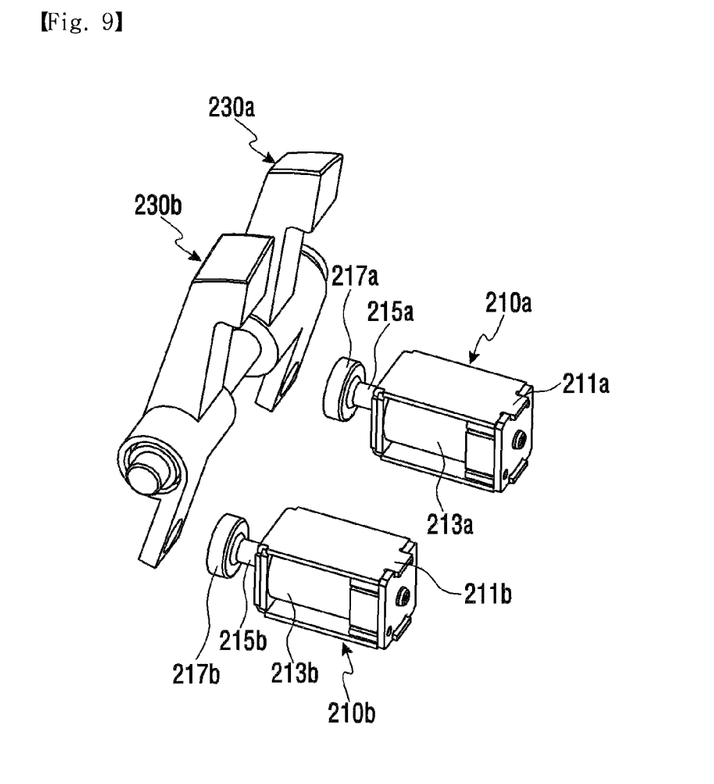
FIG. 9 shows that shift lock levers shown in FIG. 6 have performed a rotary motion at a predetermined angle in a clockwise direction in accordance with a linear motion of lock rods according to an embodiment of the present disclosure.

Meanwhile, in this state, when the lock rods 215*a* and 215*b* are moved in a right select direction by the controller 300 and the moving magnets 217*a* and 217*b* are moved in the right select direction in response to the lock rods 215*a* and 215*b*, the repulsive force between the moving magnet 217*a* and 217*b* and the fixed magnet 235*a* and 235*b* is reduced by as much as the gap between the moving magnet 217*a* and 217*b* and the fixed magnet 235*a* and 235*b*. Here, an elastic force causing the return-springs 234*a* and 234*b* disposed on the rotational axes 233*a* and 233*b* to be restored to their original state becomes greater than the reduced repulsive force, so that the shift lock levers 230*a* and 230*b* return to their original position by the elastic force of the return-springs 234*a* and 234*b*. FIG. 9 shows that the shift lock levers 230*a* and 230*b* shown in FIG. 6 have performed a rotary motion at a predetermined angle in a clockwise direction in response to the linear motion of the moving magnets 217*a* and 217*b*.

The shift lock 200 may further include a sensor 250. The sensor 250 senses the positions of the other ends 232*a* and 232*b* of the shift lock levers 230*a* and 230*b*. The sensor 250 transmits information on the sensed positions of the other ends 232*a* and 232*b* to the controller 300. On the basis of the received information on the positions of the other ends 232*a* and 232*b*, the controller 300 is able to determine the states of the shift lock levers 230*a* and 230*b*. Specifically, on the basis of the received information on the positions of the other ends 232*a* and 232*b*, the controller 300 is able to determine whether the shift lock levers 230*a* and 230*b* of the shift lock 200 is in an open-state as shown in FIG. 6, or is in a locked-state as shown in FIG. 9.

The sensor 250 may include hall integrated circuits (ICs) 251*a* and 251*b*. The hall ICs 251*a* and 251*b* may sense a change of a magnetic force, and thus, detect a distance between the sensor and metal parts 236*a* and 236*b* disposed on the other side of the other ends 232*a* and 232*b*.

The hall ICs 251*a* and 251*b* may be mounted on a PCB 253. The driving parts 210*a* and 210*b* and the PCB 253 of the sensor 250 may be mounted on a mounting plate 290 shown in FIGS. 2 to 3 and fixed.

When the two shift locks 200 are, as shown in FIGS. 1 to 3, provided, the first shift lock 200*a* and the second shift lock 200*b* may be operated independently of each other by the controller 300. The description of the detailed operation of the shift lock will be provided in the description of the controller 300.

The sensor 250 independently senses the first shift lock 200*a* and the second shift lock 200*b* and transmits the sensed result to the controller 300. In this case, the first hall IC 251*a* sensing the first shift lock 200*a* and the second hall IC 251*b* sensing the second shift lock 200*b* may be disposed on the PCB 253 of the sensor 250.

The controller 300 controls the shift lock 200 by comparing the speed of the vehicle with a predetermined critical speed of the predetermined gear. Here, the controller 300 may receive information on the speed of the vehicle from the ECU 1000.

The controller 300 compares the speed of the vehicle with the critical speed of the predetermined gear. As a result of the comparison, if the speed of the vehicle is greater than the critical speed, the controller 300 controls the shift lock 200 to be located on the shift path of the predetermined gear, and limits the movement of the rod 110 in the shift direction of the predetermined gear.

For a concrete example, an example in which the first shift lock 200*a* shown in FIG. 2 limits the movement of the rod 110 in the shift direction of the first gear will be described with reference to FIGS. 10 and 11.

Figure 10:
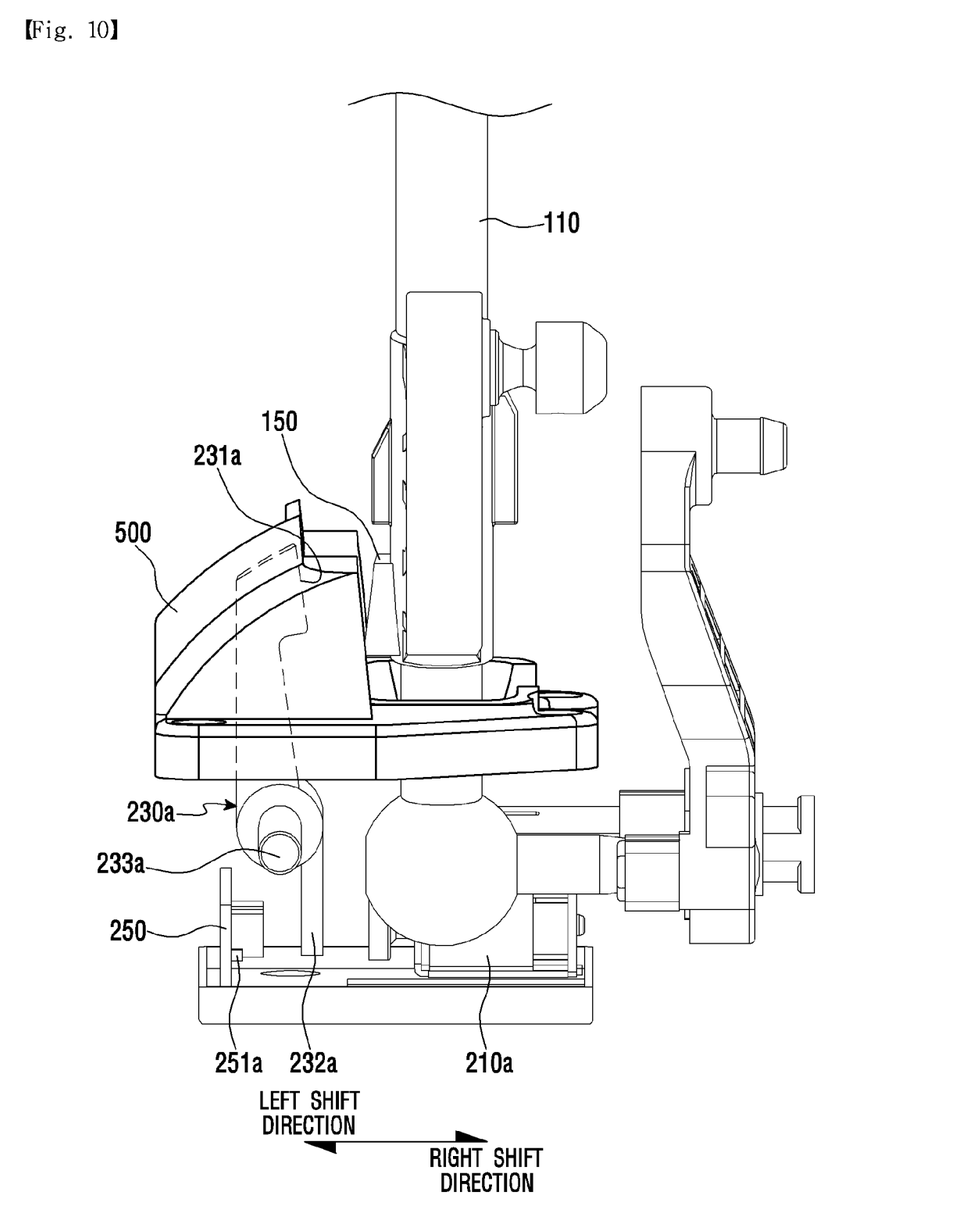
FIGS. 10 to 11 are views showing an example where a first shift lock shown in FIG. 2 limits the movement of the rod in a shift direction of a first gear according to an embodiment of the present disclosure.
Figure 11:
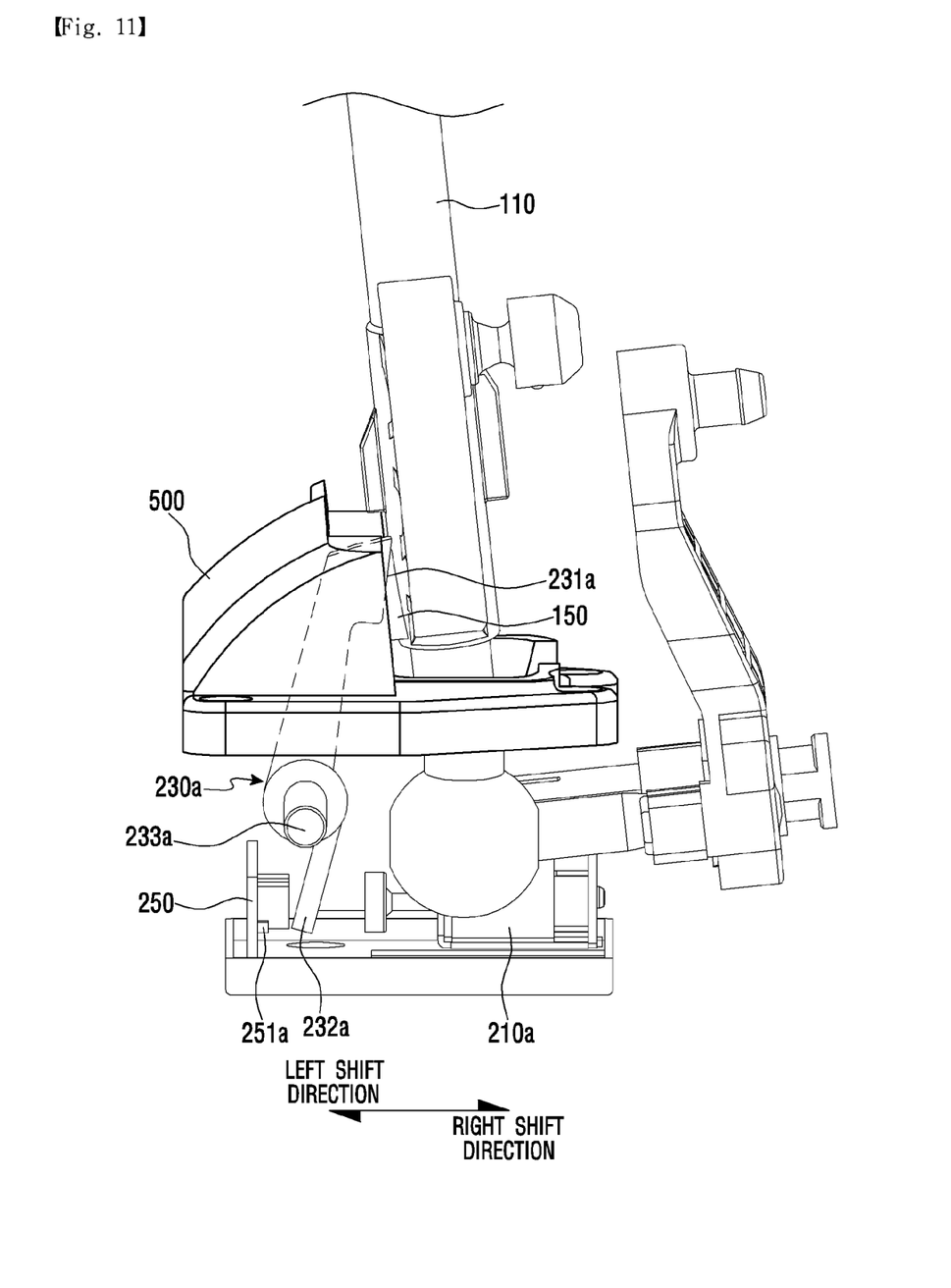

FIGS. 10 and 11 show a series of the process preventing shifting to the first gear in a state where the vehicle on which the shift control apparatus of the manual transmission according to the embodiment of the present disclosure has been mounted travels at a high speed. Specifically, FIG. 10 shows that the vehicle is traveling at a low speed and FIG. 11 shows that, while the vehicle travels at a high speed, the driver has moved the rod 110 in the left select direction shown in FIG. 4 along the select path of the first gear in order to change the gear to the first gear.

During the process from FIG. 10 to FIG. 11, the controller 300 shown in FIG. 2 compares the vehicle's speed received from the ECU 1000 with the critical speed of the first gear (hereafter, referred to as a first critical speed). The first critical speed is a predetermined value stored in the controller 300. As a result of the comparison, if the speed of the vehicle is greater than the first critical speed, the controller 300 controls, as shown in FIG. 11, the first shift lock lever 230*a* of the first shift lock 200*a* to be located on the shift path of the first gear.

In order that the first shift lock lever 230*a* is located on the shift path of the first gear, the controller 300 applies a current signal to the first solenoid 211*a* and causes the first moving magnet 217*a* to perform a rectilinear motion in the left select direction. Then, the other end 232*a* of the first shift lock lever 230*a* rotates clockwise around the first rotational axis 233*a* at a predetermined angle by the first moving magnet 217*a*. Simultaneously with this, the first end 231*a* of the first shift lock lever 230*a* rotates clockwise at the predetermined angle. When the first end 231*a* of the first shift lock lever 230*a* is located on the shift path of the first gear by the rotation of the first shift lock lever 230*a*, the stopper 150 mounted on the rod 110 is blocked by the first end 231*a* of the first shift lock lever 230*a*, so that the rod 110 cannot proceed any more in the shift direction of the first gear.

Meanwhile, for another concrete example, an example in which the first shift lock 200*a* shown in FIG. 2 limits the movement of the rod 110 in the shift direction of the first gear and independently of this, the second shift lock 200*b* limits the movement of the rod 110 in the shift direction of the second gear will be described with reference to FIG. 12.

Figure 12:
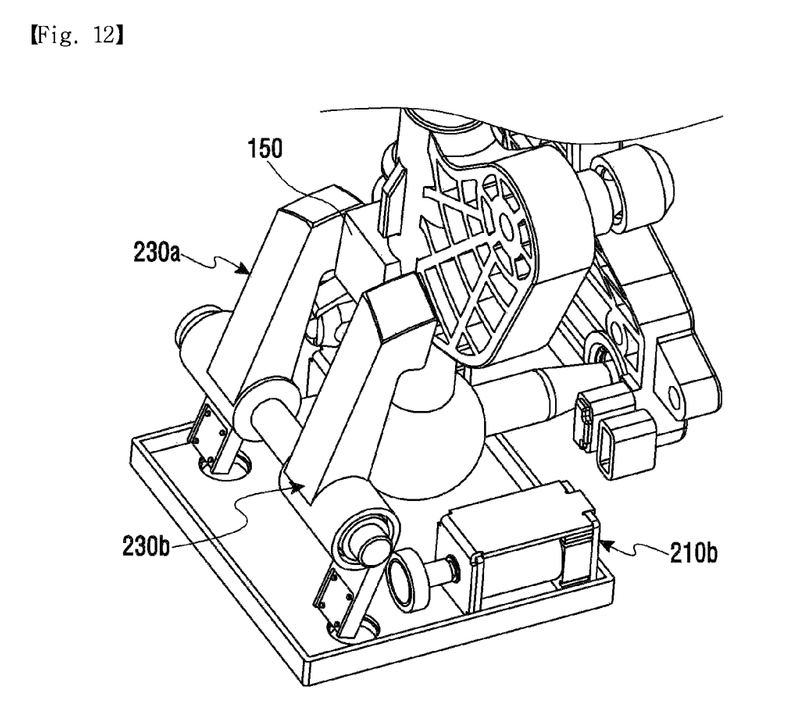
FIG. 12 is a view showing a state where the first shift lock and a second shift lock limit the movement of the rod according to an embodiment of the present disclosure.

FIG. 12 is a view showing a state where the first shift lock 200*a* and the second shift lock 200*b* limit the movement of the rod 110 according to an embodiment of the present disclosure.

FIG. 12 shows a result obtained by controlling the first shift lock 200*a* and the second shift lock 200*b* shown in FIG. 2 under a predetermined condition by the controller 300 shown in FIG. 2. Hereafter, the predetermined condition will be described in detail.

The controller 300 compares the vehicle's speed received from the ECU 1000 with the critical speed of the first gear and the critical speed of the second gear (hereafter, referred to as a second critical speed). The first and second critical speeds are predetermined values stored in the controller 300.

As a result of the comparison, if the speed of the vehicle is greater than the first critical speed and the second critical speed, the controller 300 controls, as shown in FIG. 12, the first shift lock lever 230a of the first shift lock 200a to be located on the shift path of the first gear and controls the second shift lock lever 230b of the second shift lock 200b to be located on the shift path of the second gear.

Meanwhile, as a result of the comparison, if the speed of the vehicle is greater than the first critical speed and is less than the second critical speed, the controller 300 controls, as shown in FIG. 12, the first shift lock lever 230a of the first shift lock 200a to be located on the shift path of the first gear, and controls the second shift lock lever 230b of the second shift lock 200b not to be located on the shift path of the second gear. This means that while the shifting to the first gear at the current speed of the vehicle is not permitted, the shifting to the second gear is permitted.

Referring back to FIG. 1, the cover 500 is disposed on the bracket 700 and is coupled to the bracket 700.

The cover 500 covers the shift lock 200 shown in FIG. 2 and has an opening that the one end 231a of the first shift lock lever 230a enters. In the open-state shown in FIG. 10, the cover 500 may protect and conceal the first shift lock lever 230a by covering the first shift lock lever 230a. Meanwhile, in the locked-state shown in FIG. 11, the one end 231a of the first shift lock lever 230a may come out through the opening of the cover 500.

The bracket 700 surrounds and protects the shift lever 100, the shift lock 200, and the select lever 900.

The select lever 900 is coupled to the shift lever 100. The select lever 900 is interlocked with the shift lever 100. When the rod 110 of the shift lever 100 moves in the select direction, the select lever 900 may moves together with the rod 110.

The ECU 1000 senses the speed of the vehicle on which the shift control apparatus of the manual transmission according to the embodiment of the present invention is mounted. Also, the ECU 1000 transmits information on the sensed speed of the vehicle to the controller 300. The ECU 1000 may not only sense the speed of the vehicle but also control an electrical system or a subsystem of the vehicle.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A shift control apparatus of a manual transmission, the shift control apparatus comprising:
   a shift lever comprising a rod;
   a shift lock limiting the movement of the rod; and
   a controller which compares a speed of a vehicle with a predetermined critical speed of a predetermined gear and controls the shift lock,
   wherein the shift lock comprises:
   driving parts comprising moving magnets and which linearly reciprocate in a left select direction of the rod and in a right select direction of the rod; and
   shift lock levers comprising first ends and other ends on which fixed magnets are disposed and rotational axes disposed between a first end and another end, and wherein, when the speed of the vehicle is greater than the critical speed, the controller moves the moving magnets in the left select direction, the fixed magnet moves in the left select direction by a repulsive force between the moving magnet and the fixed magnet, the shift lock levers are located on a shift path of the predetermined gear, and the movement of the rod is limited in a shift direction of the predetermined gear,
   wherein the other end rotates at a predetermined angle with respect to the rotational axis in association with the movement of the fixed magnet,
   and wherein the first end rotates at the predetermined angle with respect to the rotational axis in accordance with the rotation of the other end and is located on the shift path of the predetermined gear.

2. The shift control apparatus of the manual transmission of claim 1,
   wherein return-springs are disposed on the rotational axes,
   and wherein, when the speed of the vehicle is less than the critical speed, the controller moves the moving magnets in the right select direction, the end rotates reversely at the predetermined angle with respect to the rotational axis by an elastic force of the return-springs, so that the end is not located on the shift path of the predetermined gear.

3. The shift control apparatus of the manual transmission of claim 1,
   wherein the driving parts further comprise bodies having a permanent magnet disposed therein, and lock rods having a magnet disposed therein,
   and wherein the controller controls a direction of a current applied to the body, and, the polarity of a magnetic field within the body is changed, so that the lock rod linearly reciprocates.

4. A shift control apparatus of a manual transmission, the shift control apparatus comprising:
   a shift lever comprising a rod;
   a shift lock limiting the movement of the rod; and
   a controller which compares a speed of a vehicle with a critical speed of a predetermined gear and controls the shift lock,
   wherein the shift lock further comprises shift lock levers comprising first ends and other ends and rotational axes disposed between a first end and another end, and a sensor sensing positions of the other ends,
   wherein the sensor transmits information on the sensed positions of the other ends to the controller,
   wherein the controller determines whether the shift lock is in an open-state or in a locked-state on the basis of the received information on the positions of the other ends, and wherein, when the shift lock is in an open-state and the speed of the vehicle is greater than the critical speed, the controller controls the shift lock to be located on a shift path of the predetermined gear, thereby limiting the movement of the rod in a shift direction of the predetermined gear, wherein the other end rotates at a predetermined angle with respect to the rotational axis, and wherein the first end rotates at the predetermined angle with respect to the rotational axis in accordance with the rotation of the other end and is located on the shift path of the predetermined gear.

5. The shift control apparatus of the manual transmission of claim 4, wherein metal parts are disposed on the other side of the other ends, and wherein the sensor comprises hall integrated circuits (ICs) detecting a distance between the sensor and metal parts.

6. The shift control apparatus of the manual transmission of claim 4, wherein the shift lever further comprises a stopper disposed on the rod, and wherein the stopper is disposed to lean in a left select direction of the rod.

7. The shift control apparatus of the manual transmission of claim 4, wherein the rod further comprises a stopper, and wherein the stopper has a shape protruding in a left select direction of the rod.

8. The shift control apparatus of the manual transmission of claim 4, further comprising an electronic control unit (ECU) which measures the speed of the vehicle, wherein the controller receives the speed of the vehicle from the ECU.

9. The shift control apparatus of the manual transmission of claim 4, wherein the shift lock comprises a first shift lock and a second shift lock which are operated independently of each other, wherein the predetermined gear comprises a first gear and a second gear, wherein the critical speed comprises a first critical speed of the first gear and a second critical speed of the second gear, wherein the second critical speed is greater than the first critical speed, and wherein, when the speed of the vehicle is less than the second critical speed and greater than the first critical speed, the controller controls the first shift lock to be located on a shift path of the first gear and controls the second shift lock not to be located on a shift path of the second gear.

* * * * *